Aug. 13, 1968   J. W. SMITH ET AL   3,396,962

BASIC OXYGEN FURNACE LINING CONSTRUCTION

Filed Sept. 6, 1967   3 Sheets-Sheet 1

INVENTORS.
JOSEPH W. SMITH
CHARLES W. KEENE
BY.
ATTORNEY

INVENTORS.
JOSEPH W. SMITH
CHARLES W. KEENE
BY
ATTORNEY

Aug. 13, 1968   J. W. SMITH ET AL   3,396,962
BASIC OXYGEN FURNACE LINING CONSTRUCTION
Filed Sept. 6, 1967   3 Sheets-Sheet 3

INVENTORS.
JOSEPH W. SMITH
CHARLES W. KEENE
BY
ATTORNEY

United States Patent Office 3,396,962
Patented Aug. 13, 1968

3,396,962
BASIC OXYGEN FURNACE LINING
CONSTRUCTION
Joseph W. Smith, 1520 Kansas Ave., McKeesport,
Pa. 15131, and Charles W. Keene, 825 Catherine,
Duquesne, Pa. 15110
Filed Sept. 6, 1967, Ser. No. 665,765
2 Claims. (Cl. 266—43)

ABSTRACT OF THE DISCLOSURE

This disclosure deals with construction for the bottom and knuckle-joint portions of the working lining of a basic oxygen furnace. The lining is built of three different types of brick, two being conventional, and the third a simple adaptation of a conventional brick. These shapes are a key, a straight, and a straight with one end cut on a bias.

---

Historically, the use of oxygen in the steelmaking process is not new. Sir Henry Bessemer is recognized for suggesting its use in 1856, although it really wasn't practical before large-scale oxygen plants were developed; this is reported to have been about 1928, and being based on the Linde-Frankel process. Initial trial applications of oxygen were in the blast furnace to increase production and reduce coke requirements. In subsequent years, the oxygen was used to increase production rates in such as the open hearth; but problems arose due to lower roof life and loss of furnace availability, according to the literature.

Finally, in the Austrian plants of Linz and Donawitz, there was developed the forerunner of the modern oxygen steelmaking process. The initials of Linz and Donawitz early resulted in calling the process the "LD" process. Subsequently, it has variously been designated the oxygen Bessemer process, oxygen converter process, and the oxygen steelmaking process. The furnaces in which these processes are carried out, and the processes themselves, are often now—in a shorthand manner—referred to as the "BOF" (basic oxygen furnace) or "BOP" (basic oxygen process). The latter seems to be more prevalent among steelmakers, and the former among refractories manufacturers.

The BOF or BOP furnace structure fundamentally consists of an open-topped, generally pear-shaped, metal shell having a refractory lining therein. This lining usually consists of an inner or working lining which is exposed to the rigors of the steelmaking process itself, behind which is a shell, exterior, or tank lining. Sometimes there is an intermediate brick or rammed lining between the tank lining and the working lining.

Both the vessel and the lining and, thus, the entire furnace can be considered as generally composed of three major zones. These are the bottom zone, the intermediate barrel zone, and the cone section zone. The bottom zone is generally of inverted dome or upwardly-opening dish-shape. The barrel zone, which is the generally upright intermediate portion, is interconnected through a knuckle joint with the bottom zone and extends upwardly to the cone section which is of downwardly-opening, generally truncated, cross-sectional configuration.

The refractory brick used to line the vessel are usually of conventional key- or wedge-shape, wherever possible. Usually, all brick in the working lining are laid so that the smallest end surface is exposed to the interior of the vessel, due to the circumferential or dome-shaped configuration of the vairous parts.

The area of the vessel where the barrel zone brick approach the bottom zone brick; namely, the critical knuckle area, is one of the most distressing areas in the vessel as far as lining construction is concerned. At this point or circumferential area, the top and bottom face surfaces of bottom zone brick are inclined at an angle relative to the vertical axis of the vessel, due to the inverted dome configuration of the bottom; whereas, the top and bottom faces of the barrel zone brick are perpendicular to the vertical axis of the vessel. This knuckle zone area, in cross-section, is either of generally triangular or truncated triangular cross-section, and is arcuate at its larger end. Because of this, it is most difficult to line with brick.

Many different solutions have been suggested. Two are described on page 129 of the Iron and Steel Engineer for February of 1966. One solution is to use a ramming mix or some manner of monolith to fill the knuckle void; the other is to lay a plurality of relatively flat, thin brick in what is designated a "stadium configuration."

Such as the United States patent to Alper et al., No. 3,281,137, shows a different solution comprised of preforming a group of special shapes. With the possible exception of the Alper et al. construction, prior solutions still have not come to grips with the problems arising from the fact the major point of weakness to the structural integrity of the lining is at the knuckle joint. This area seems to be a focal point for the stresses and strains caused by the movement of the vessel itself during the steelmaking operation; and, of course, the Alper et al. approach requires use of complicated and expensive special preformed shapes.

It is therefore among the objects of the present invention to provide improved cooperating bottom and knuckle area working lining construction which requires use of but three different shapes. Two of the shapes are conventional, and the third is a simple adaptation of a conventional shape. It is an additional object of the invention to assure contiguous abutting face-to-face brick contact between the bottom through the knuckle joint and to the bottom of the brick in the barrel zone. The former assures bearing surfaces between adjacent brick throughout the bottom, knuckle, and side wall. Such an arrangement puts thrust through the knuckle joint to the inverted dome which is the bottom, increasing denseness of brick-pack through the dome and lower side walls to promote working lining solidarity to thereby increase ability to withstand the violent impact of large chunks of scrap which are dropped into the vessels during charging, and better resist the stresses and strains caused by physical movement and manipulation of the vessel during steelmaking operations.

It is a further object of the invention to provide a bottom and knuckle joint construction for the working lining of an oxygen steelmaking vessel, which is entirely of brick, and does away with any requirement of extraneous ramming equipment and the like necessary to compact monoliths.

It is yet another object of the invention to provide a procedure for much more rapid construction of the bottom and knuckle joint areas of the working lining of oxygen steelmaking vessels.

Briefly, according to one aspect of the invention, there is provision in an oxygen converter vessel comprised of a pear-shaped, open-topped, metal shell having a shell protective lining therein with a working lining over said shell protective lining of an improved bottom and knuckle area construction for the working lining. The bottom is fabricated of a plurality of conventional key shapes. The key shapes are laid in rows "soldier style." The rows of brick are arranged in parallel groups.

The parallel groups of rows terminate at substantially the beginning of the knuckle area. Said parallel groups intersect each other about the periphery of the bottom at at least four spaced joints, these joints being in two sets, respective members of a given set being spaced apart from each other a distance equal to the distance between the other two joints. A plurality of conventional straights and straights having an end cut at a bias are used to fill the area between the bottom and the beginning of the barrel zone, and present a substantially flat surface for support of the barrel zone working lining. The angle of the bias is substantially identical to the angle at which the key faces of the bottom are cut so thay may be moved into abutting relationship therewith. A plurality of layers of such biased brick are arranged, one on top of another, to completely cover the periphery or circumferentially exposed faces of the key brick which define the bottom. The bias-cut brick intersect each other at right angles at each of said bottom zone periphery joints. The space behind the points of intersection is filled with conventional straights laid in a herringbone pattern. The series of apexes, which together form the herringbone configuration, lie on a radius of the dome-shaped bottom.

Other objects, further features and advantages, and a better understanding of the present invention will become apparent from a study of the following detailed description, together with reference to the appended exemplary drawings.

Before describing the drawings in detail, it should be understood they are but exemplary of preferred practices according to the present invention, and are not intended as limiting. The true spirit and scope of the invention is as defined in the hereafter appended claims.

Figure 1:
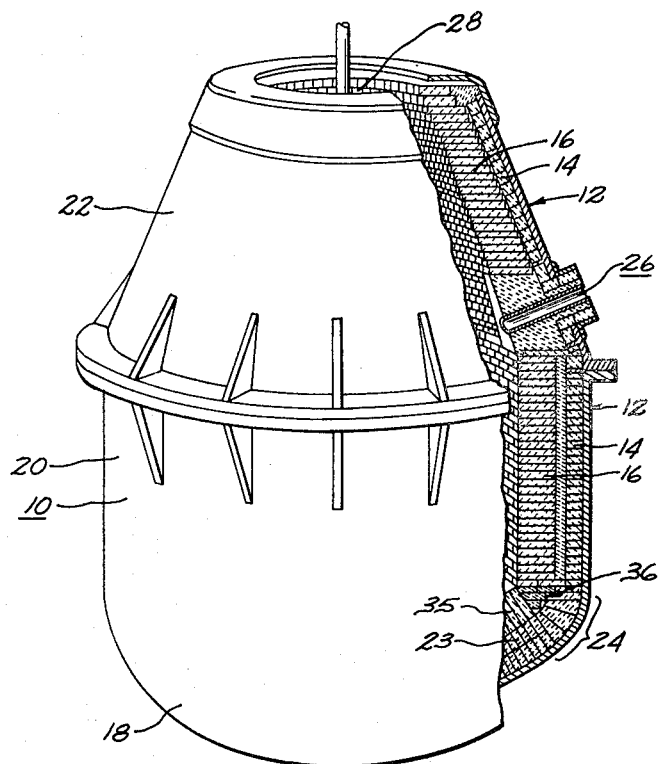
FIG. 1 is a schematic elevational view partially broken away of a typical oxygen converter vessel including a knuckle joint and bottom construction according to the present invention.

In FIG. 1, we have indicated a typical basic oxygen furnace 10 comprising an outer metal shell 12, a shell protective or backup brick lining 14 in contact with the inside surface of the shell 12, and a brick working lining 16. The furnace is constructed in three major zones including the bottom zone 18, the barrel zone 20, and the cone section zone 22. The bottom zone is of upwardly-opening, dish-shape, or can be described as an inverted dome. The brick 23 in the bottom zone of the backup lining terminate in a knuckle area 24. The bottom working lining is comprised of brick 35 which terminate in the knuckle area 36. The cone section zone, having a taphole 26, extends upwardly and terminates in the form of a mouth 28 at the top of the vessel.

Figure 2:
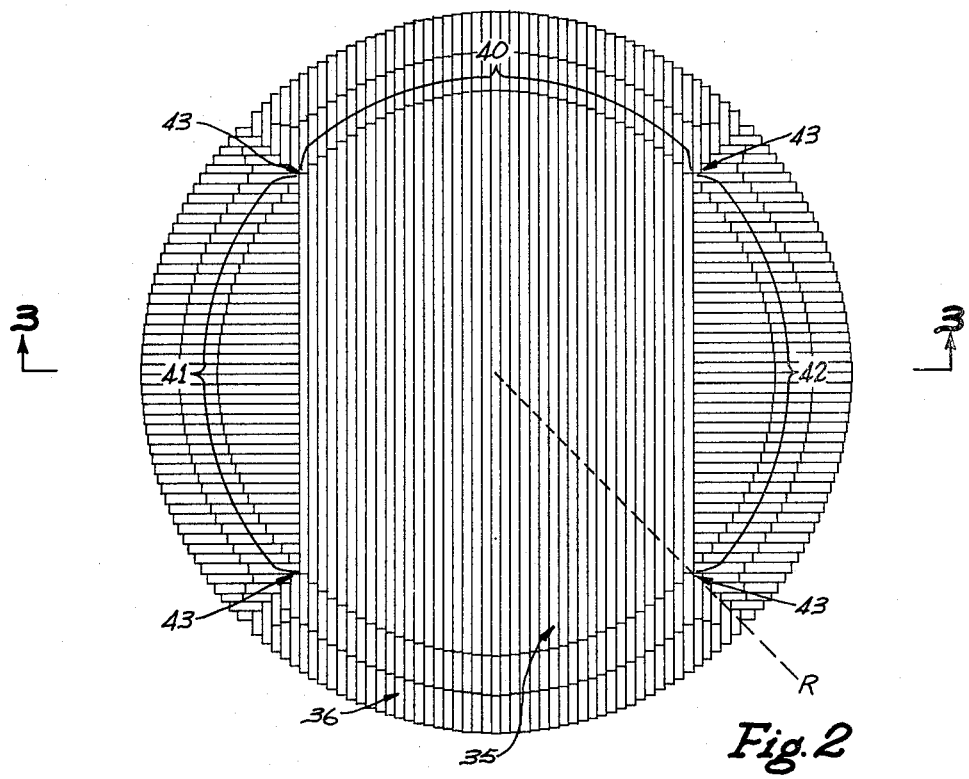
FIG. 2 is a top view of a bottom construction embodying the concepts of this invention.
Figure 3:
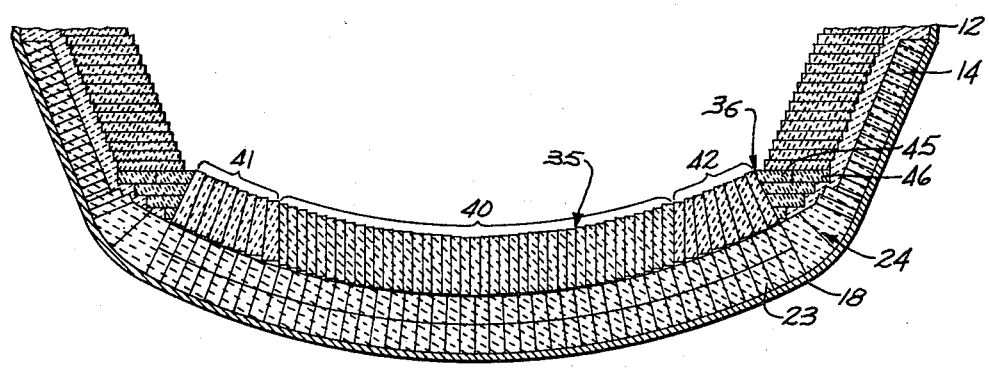
FIG. 3 is a sectioinal view of the arrangement of FIG. 2, along the line 3—3.

Referring to FIGS. 2 and 3, the working lining for the bottom is comprised of a plurality of conventional key-shaped brick arranged in parallel rows soldier-style. A key is defined as a brick shape having six plane faces (two sides, two edges, and two ends), in which two faces (the edges) are inclined toward each other and one of the end faces is narrower than the other. These brick are arranged in a plurality of groups of parallel rows so the flat sides lie on a chord of the dome-shaped bottom. We have shown three groups: the first being group 40, the second being group 41, and the third being group 42. These various groups intersect each other and form four spaced joints or intersections about the periphery or circumference of the bottom zone, and these joints are designated 43 in the drawings.

About the bottom zone is the knuckle area 36 and, viewed from the top, appears as a plurality of rectangular shapes which meet or intersect in a herringbone relationship adjacent each of the points 43. The apexes of the intersection of the rectangular brick, which together form the herringbone, lie on a radius R of the circle which generally defines the top or terminus of the inverted, dome-shaped, bottom portion.

As can be seen in FIG. 2, the knuckle area is comprised of a plurality of layers of brick. Those brick abutting the last key brick in any of the various parallel rows which make up the bottom are cut on a bias to form a slope complementary to the outer key-surface they abut in bearing relation. One of these is such as brick 45 in FIG. 3. The other brick in each of the layers are regular straights, such as brick 46 in FIG. 3. A straight is defined in the refractories art as a regular rectangular shape, confined by three parallel sets of flat faces.

Figure 6:
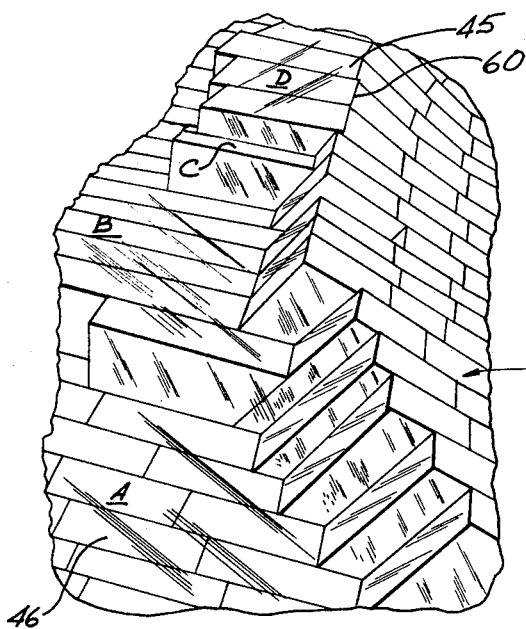
FIG. 6 is a fragmentary, schematic, perspective view of the knuckle joint of FIG. 2 at a partially completed stage.
Figure 4:
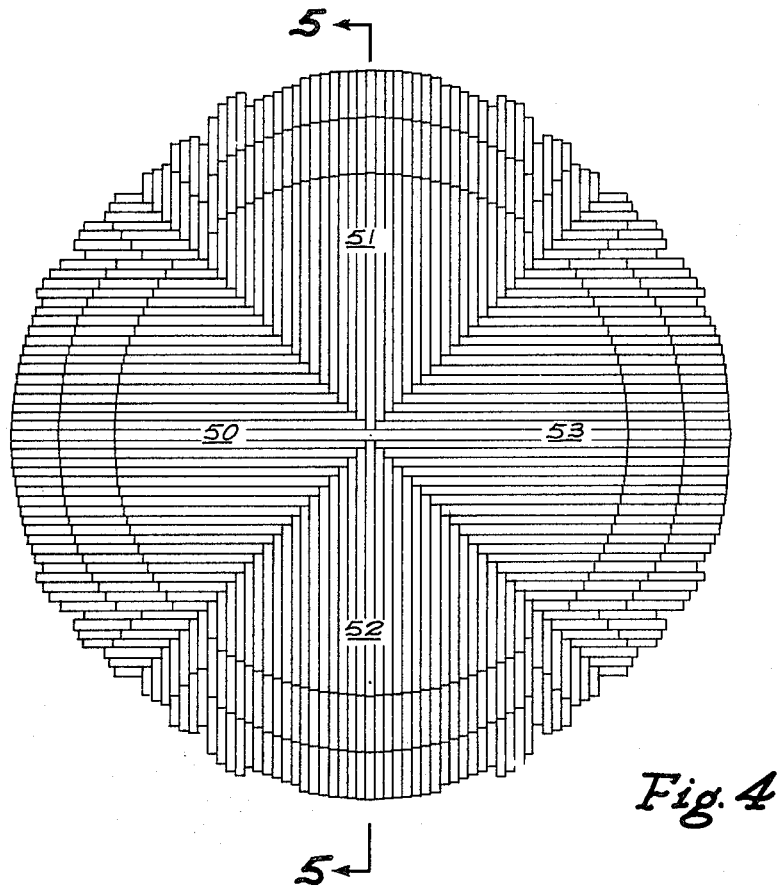
FIG. 4 is an alternate brick construction for the bottom.
Figure 5:
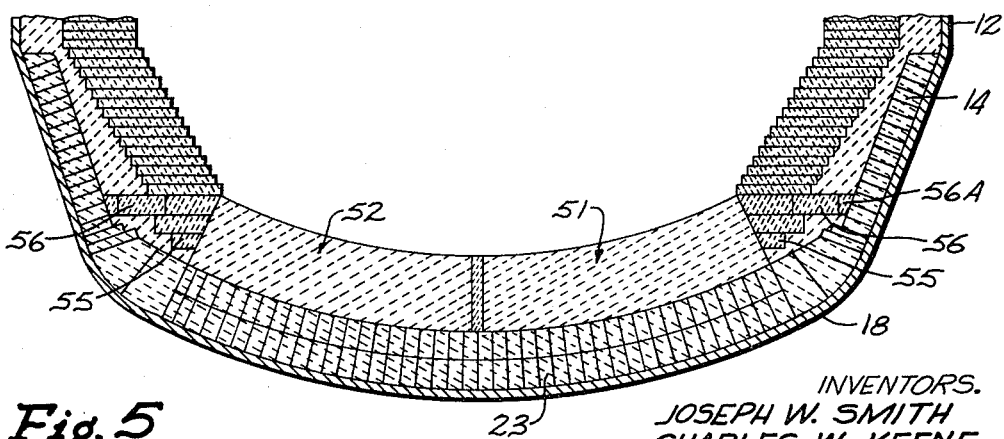
FIG. 5 is a sectional view along the line 5—5 of FIG. 4.

In FIGS. 5 and 6, a modified construction is shown. Details of the tank or backup lining and shell are omitted for drawing simplicity. The bottom zone is comprised, again, of a plurality of conventional key shapes laid "soldier-style" in groups of parallel rows. There are four such groups of parallel rows 50, 51, 52, and 53, shown in FIG. 4. End members of the various rows intersect adjacent rows along radii of the circle which defines the bottom to form a generally herringbone configuration. These radii are at 90° relative to each other. The knuckle area of FIGS. 4 and 5, as was the case of the arrangement of FIGS. 2 and 3, is comprised of a plurality of regular straights and straights having one end cut at such a bias as to abut in bearing relation with last or end members of the various rows of key brick forming the bottom zone. In FIGS. 3 and 4, we illustrate four layers. In FIG. 5, we show but three layers. Each layer includes one of the bias-cut brick, such as 55. The remainder of the knuckle area is filled with regular straights 56.

As can be seen from the foregoing, it is essential there be at least four points about the circumference of the bottom where the knuckle brick will intersect in a herringbone relation. If such is not the case, nonconventional and expensive special shapes would be required. Another remarkable aspect of the present invention is immediately evident when one realizes that but three kinds of brick are involved. The difference between the three shapes is readily apparent to the eye of even the most inexperienced bricklayer. The keys go in the center, and all keys are equivalent. The straights with one end cut at a bias are all equivalent, and all go in the knuckle abutting the last of one of the rows of keys in the bottom; and the other brick are all straights which, again, are all equivalent. As will be understood by those skilled in the art, a bricklayer may break brick to shorten them in laying-up the knuckle area. Thus, the brick 55 of FIG. 5 could be a half of one of the special straights of the bias-cut end with the other half being used in a higher or subsequent layer. The foregoing aspect of the invention is brought even more sharply into focus when one considers the great material handling problem implicit in the lining of a BOF vessel. The mouth at the top of the vessel is usually quite small, as compared to the size of the vessel. It is usually a considerable height above the bottom of the vessel; and it is conventional to temporarily install a small elevator to get the brick through the mouth and down into the vessel. There may be six or more bricklayers in the bottom of the vessel. The more shapes which are required, the more complicated the job of programming their arrival at the bottom of the vessel for the bricklayers becomes. This problem simply does not arise when utilizing the concepts of the present invention.

Another desirable aspect of the present invention is the relative abandon or lack of particular care with which the bottom may be laid. There is merely the necessity of keeping substantially parallel rows, and in filling out a fairly circular area. There is no special requirement of truing the edges up about the circumference of the bottom. FIG. 6 illustrates this very nicely. Under conventional practice, it is necessary that the knuckle area have an upper surface which is substantially flat and at least equal to the thickness of the wall to be built above it. With prior practices, this required quite careful laying and, perhaps, even shimming-up of the end brick in the bottom to obtain a substantially circular outer configuration for the bottom. Not so, according to the present invention, since all end members of the bottom will have substantially the same slope at the substantial extremity of the bottom; and this slope is equivalent to any one of the members 45. The members 45 can be put in, built up, and, remarkably enough, even allowed to over-hang—as at 60 in FIG. 6—to accommodate the thickness of barrel wall one desires. Further, the rearmost part of the knuckle area, such as at 56A in FIG. 5, can be filled-in by breaking the regular straights and filling-in this much less critical area back adjacent the tank or backup lining. In addition, unconsolidated fill can be placed in any irregular opening and spaces—a common expedient—to finish the bottom and knuckle area. Such fill can also be used to even the first layer of brick in the knuckle area.

In FIG. 6, we have shown four steps or layers and labeled them A, B, C, and D, which are laid to accommodate the full length of the faces of the endmost of the brick 35 in the bottom. Also, while we show the bias-cut from one thin face to the other, it could be the other way—across the wider faces.

The arrangement of FIG. 3 is considered the preferred practice of the present invention. In one exemplary vessel, the central section 40 is comprised of about seventeen rows, and the areas 41 and 42 are of sufficient rows to complete the bottom. In a preferred practice, the joints 43 are at 90° relative to each other; although we prefer the arrangement of FIG. 2, since less strict attention is necessary to where the joints 43 fall. Further, joints such as 43 need not be regularly spaced about the periphery of the knuckle area. For example, considering FIG. 2, there could be more rows on one side of the bottom center line than the other running entirely across the bottom.

In the preferred practice of the present invention, the bottom zone and knuckle area are fabricated of ceramically bonded, predominantly dead burned, periclase brick impregnated throughout with a nonaqueous, cokable, carbonaceous, impregnating material. Satisfactory brick could be of the type, for example, disclosed and claimed in U. S. Patents 3,106,475, 3,141,790, etc.

Having thus described the invention in detail and with sufficient particularity as to enable those skilled in the art to practice it, what is desired to have protected by Letters Patent is set forth in the following claims.

We claim:
1. An oxygen converter vessel working lining construction comprising a plurality of conventional key shapes laid soldier-style in rows, said rows arranged in groups, there being sufficient groups to form at least four intersecting joints about the circumference of the bottom, there being a plurality of conventional refractory straights having one end cut on a bias, the angle of the bias being complementary to the angle at which said end members of the rows of key shapes in the bottom lie and being abutted thereagainst in bearing relation, there being four 90° intersections of said bias-cut shapes coincident with said joints in the bottom, the remainder of the knuckle joint being filled with a plurality of conventional straights and portions of conventional shapes and bias-cut shapes, said straights and portions intersecting at at least four points to form a herringbone configuration with said intersecting bias-cut shapes each 90° of the circumference of the bottom, and the apexes of the shapes forming a said herringbone lying on a radius of the bottom, the uppermost layer of the knuckle working lining being substantially perpendicular to the vertical axis of the vessel.

2. In an oxygen converter vessel comprising a metal shell having a mouth at its top, a shell protective lining in contact with the inside surface thereof, and a working lining, said working lining comprised of three major zones including the bottom, barrel, and cone section zone, the bottom zone being of generally inverted dome shape, the brick in the bottom zone terminating in a knuckle area, the vessel in the knuckle area being characterized by a curvature bridging the bottom and barrel zone, the improvement comprising a bottom zone comprised of a plurality of conventional key shapes laid soldier-style in rows, said rows arranged in groups, there being sufficient groups to form at least four joints of intersection about the circumference of the bottom, there being a plurality of conventional refractory straights having one end cut on a bias, the angle of the bias being complementary to the angle at which said end members of the rows of key shapes in the bottom lie and being abutted thereagainst in load-bearing relation, there being four 90° intersections of said bias-cut shapes coincident with said joints in the bottom circumference, substantially the remainder of the knuckle area being filled with a plurality of straights defined by three 90°-intersecting parallel sets of flat faces, and said straights intersecting at 90° at at least four joints to form a herringbone configuration with said intersecting bias-cut shapes, and the apexes of the shapes forming said herringbone lying on a radius of the dome-shaped bottom, an uppermost layer of straights and bias-cut straights forming a flat circumferential surface about the bottom which is substantially perpendicular to the vertical axis of the vessel and equal to the thickness of the working lining for the barrel zone immediately thereabove.

References Cited

UNITED STATES PATENTS

| 3,190,626 | 6/1965 | Schwabe | 266—43 |
| 3,272,490 | 9/1966 | Ross | 266—43 |
| 3,281,137 | 10/1966 | Alper et al. | 266—43 |
| 3,370,840 | 2/1968 | Cole | 266—43 |

OTHER REFERENCES

Blast Furance and Steel Plant, May 1959, p. 473.
Iron and Steel Engineer, vol. 43, No. 2, February 1966, p. 129.
The Refractories Journal, May 1964, p. 197.

J. SPENCER OVERHOLSER, *Primary Examiner.*

E. MAR, *Assistant Examiner.*